United States Patent [19]
White et al.

[11] Patent Number: 5,638,271
[45] Date of Patent: Jun. 10, 1997

[54] APPARATUS AND METHOD FOR ASSISTING GEAR ENGAGEMENT IN CONTROLLING THE AUTOMATIC SHIFTING OF A MANUAL-AUTOMATIC TRANSMISSION

[75] Inventors: Gregory R. White, Columbus; Bryan S. Gatewood, Westport; Mark L. Wilson, Columbus, all of Ind.; Peter J. Griffen, North Yorkshire, United Kingdom; Dennis Schwaiger, Whitmore Lake, Mich.

[73] Assignee: Cummins Engine Company, Inc., Columbus, Ind.

[21] Appl. No.: 368,377

[22] Filed: Jan. 4, 1995

[51] Int. Cl.$^6$ ............................................. B60K 41/06
[52] U.S. Cl. ............................ 364/424.093; 477/107; 477/121; 364/424.095
[58] Field of Search ............................ 364/424.1; 477/77, 477/78, 79, 80, 107, 110, 124, 115, 121, 123

[56] References Cited

U.S. PATENT DOCUMENTS

| | | | |
|---|---|---|---|
| 3,732,755 | 5/1973 | Beig | 477/131 |
| 4,106,584 | 8/1978 | Matsubara | 180/177 |
| 4,286,685 | 9/1981 | Rudolph et al. | 180/176 |
| 4,467,428 | 8/1984 | Caldwell | 364/426.05 |
| 4,598,374 | 7/1986 | Klatt | 364/424.1 |
| 4,630,508 | 12/1986 | Klatt | 364/424.1 |
| 4,635,508 | 1/1987 | Tatsumi | 477/125 |
| 4,648,291 | 3/1987 | Klatt et al. | 477/119 |
| 4,685,548 | 8/1987 | Holtermann et al. | 477/54 |
| 4,698,762 | 10/1987 | Moriya et al. | 364/424.1 |
| 4,702,127 | 10/1987 | Cote | 477/75 |
| 4,713,764 | 12/1987 | Klatt | 364/424.1 |
| 4,722,248 | 2/1988 | Braun | 477/78 |
| 4,823,646 | 4/1989 | Yoshimura et al. | 477/148 |
| 4,890,515 | 1/1990 | Taniguchi et al. | 477/151 |
| 4,892,014 | 1/1990 | Morell et al. | 477/92 |
| 5,043,895 | 8/1991 | Hattori et al. | 364/424.1 |
| 5,047,935 | 9/1991 | Kashihara | 364/424.1 |
| 5,047,936 | 9/1991 | Ishii et al. | 364/424.1 |
| 5,060,541 | 10/1991 | Shimanaka | 477/154 |
| 5,063,511 | 11/1991 | Mack et al. | 364/424.1 |
| 5,079,973 | 1/1992 | Ookubo et al. | 477/126 |
| 5,089,965 | 2/1992 | Braun | 364/424.1 |
| 5,090,269 | 2/1992 | Ohtsuka et al. | 74/335 |

(List continued on next page.)

FOREIGN PATENT DOCUMENTS

| | | |
|---|---|---|
| 0 364 220 A2 | 11/1989 | European Pat. Off. . |
| 0 384 413 A1 | 2/1990 | European Pat. Off. . |
| 0 466 036 A1 | 7/1991 | European Pat. Off. . |
| 2 278 654 | 5/1994 | United Kingdom . |
| WO94/21484 | 9/1994 | WIPO . |

*Primary Examiner*—Collin W. Park
*Attorney, Agent, or Firm*—Woodard, Emhardt, Naughton Moriarty & McNett

[57] ABSTRACT

An electronic engine control monitors engine speed, vehicle speed and determines various engine RPM values and RPM ranges used in fueling a molar vehicle engine to achieve desired engine speeds prior to and during an automatic gear shift sequence. The engine is coupled to a manual/automatic transmission that includes manually selectable gear operation modes and automatically selectable gear operation modes. In order to assist gear engagement of the automatically selectable gears, the engine is fueled to a series of predetermined RPM levels to rock the transmission gears into engagement. In so doing, throttle control by the operator is first inhibited and the engine is first governed to a synchronous RPM value. Throttle control is returned to the operator if gear engagement is verified within a first predetermined delay period. If gear engagement is not verified, the engine RPM is periodically increased or decreased, depending on whether an upshift or downshift is attempted, and throttle control is returned to the operator if gear engagement is verified within a second or third predetermined delay period. If gear engagement is still not verified, the engine RPM is returned to the synchronous RPM value for a fourth predetermined delay period. If gear engagement does not occur within the fourth delay period, an error recovery routine is executed.

24 Claims, 9 Drawing Sheets

UPSHIFT

U.S. PATENT DOCUMENTS

| | | | |
|---|---|---|---|
| 5,107,723 | 4/1992 | Yamashita et al. | 477/117 |
| 5,117,710 | 6/1992 | Asano et al. | 74/336 R |
| 5,117,711 | 6/1992 | Iizuka | 477/121 |
| 5,148,721 | 9/1992 | Anan et al. | 477/121 |
| 5,150,297 | 9/1992 | Daubenmier et al. | 364/424.1 |
| 5,157,607 | 10/1992 | Stainton et al. | 364/424.1 |
| 5,157,608 | 10/1992 | Sankpal et al. | 364/424.1 |
| 5,167,311 | 12/1992 | Satoh et al. | 192/73 |
| 5,182,969 | 2/1993 | Goto et al. | 477/120 |
| 5,184,301 | 2/1993 | Stasell | 364/431.07 |
| 5,401,223 | 3/1995 | White et al. | 364/424.1 X |
| 5,498,195 | 3/1996 | White et al. | 364/424.1 X |

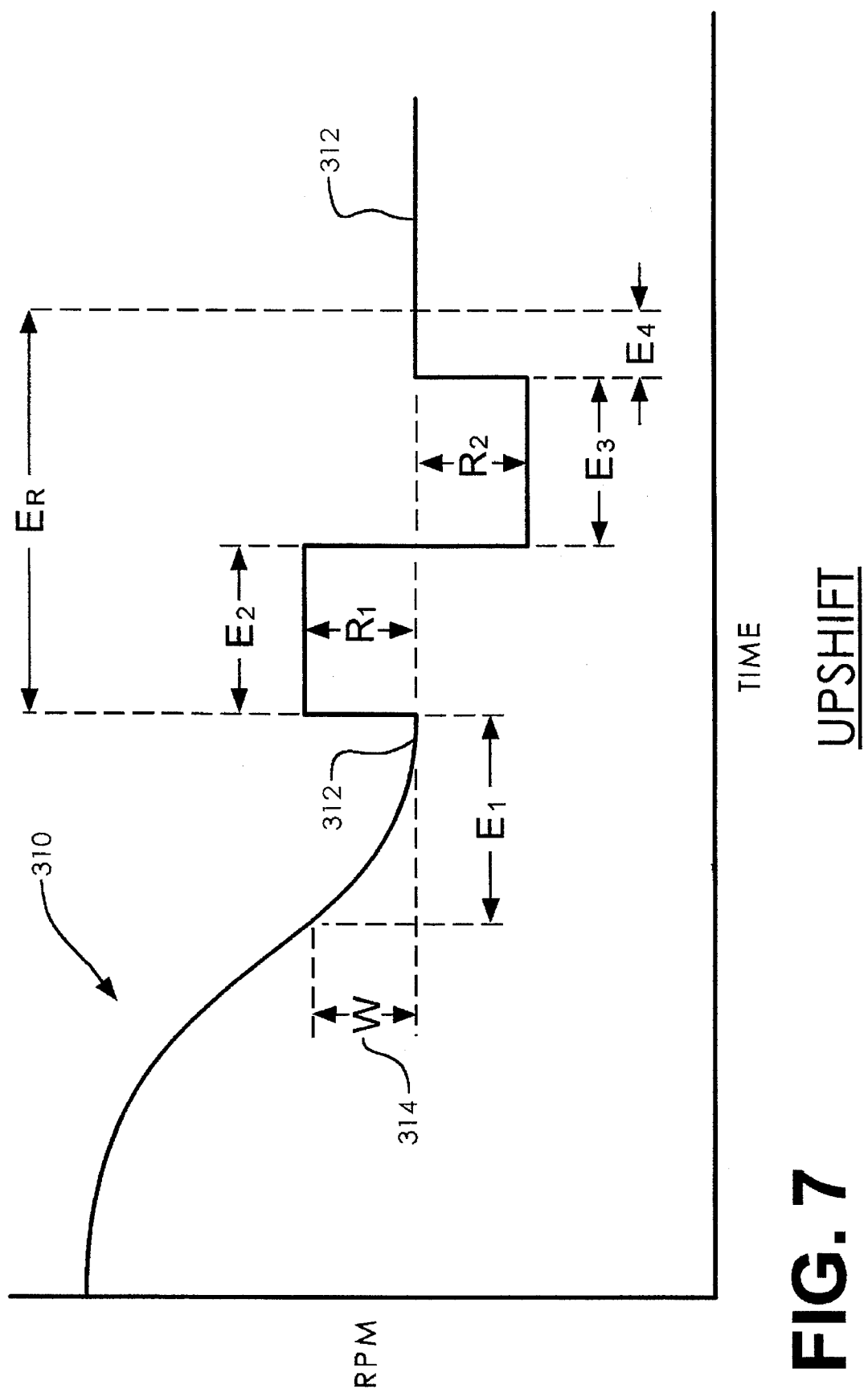
FIG. 7 UPSHIFT

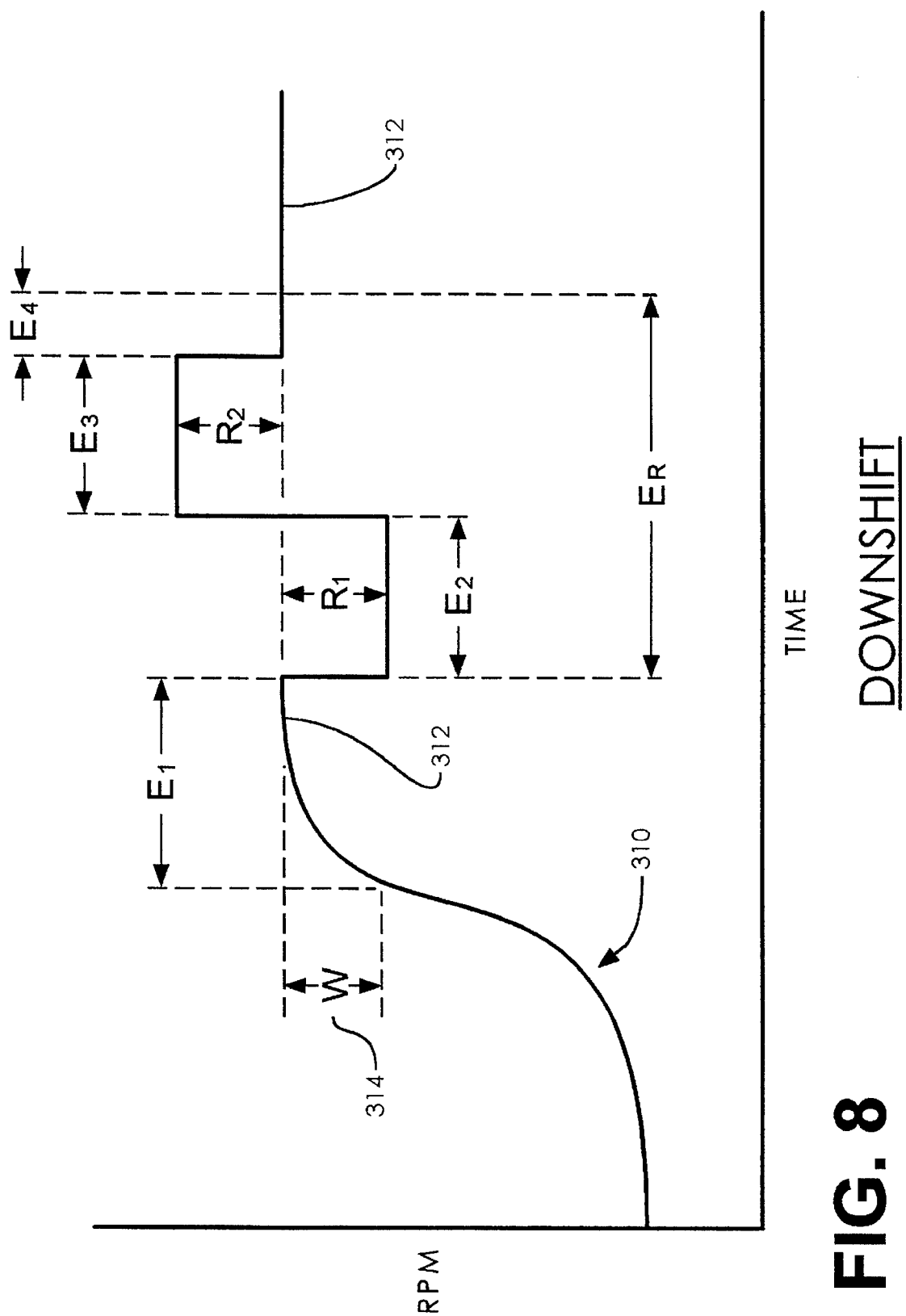

APPARATUS AND METHOD FOR ASSISTING GEAR ENGAGEMENT IN CONTROLLING THE AUTOMATIC SHIFTING OF A MANUAL-AUTOMATIC TRANSMISSION

FIELD OF THE INVENTION

The present invention relates to electronically controlled transmissions used in conjunction with internal combustion engine powered vehicles, and more specifically to a transmission/engine combination wherein the transmission is a combination manual and automatic transmission.

BACKGROUND OF THE INVENTION

Fully automatic transmission systems, both for heavy duty vehicles such as heavy duty trucks, and for automobiles, that sense throttle openings or position, vehicle speed, engine speed and the like, and automatically shift the vehicle transmission in accordance therewith, are well known in the prior art. Such fully automatic gear change transmission systems include automated transmissions wherein pressurized fluid is utilized to frictionally engage one or more members to other members or to a ground to achieve a selected gear ratio as well as automated mechanical transmissions utilizing electronic and/or pneumatic logic and actuators to engage and disengage mechanical (i.e., positive) clutches to achieve a desired gear ratio. Semi-automatic or manual-automatic transmission systems utilizing electronic control units that sense throttle position, engine speed, input shaft speed, output shaft and/or vehicle speed, and utilize automatically controlled fuel throttle devices, gear shifting devices, and/or master clutch operating devices to substantially automatically implement operator selected transmission ratio changes are also known in the prior art.

While such semi-automatic mechanical transmission systems are very well received, as they are somewhat less expensive than a fully automatic transmission systems, allow manual clutch control for low speed operation, and/or do not require automatic selection of the operating gear ratio, they may be too expensive for certain applications as a relatively large number of sensors and automatically controllable actuators, such as a master clutch and/or a fuel throttle device actuator, are required to be provided, installed, and maintained. However, with modern electronic controls for heavy duty truck engines, the majority, if not all, of the sensors are already present for providing feedback relating to engine speed, vehicle speed, throttle position, etc. Thus, an implementation of a semi-automatic transmission or manual-automatic transmission can be achieved with minor modifications to the hardware, particularly those vehicles including an electronic engine controller. Such a system is disclosed in co-pending application Ser. No. 08/108,483. Such systems require relatively sophisticated algorithms to provide reliable operation particularly with respect to the upshift and downshift of the automatically controlled gear ratios of the manual-automatic transmission.

During an electronic automatic shift, it is important to achieve gear engagement before returning throttle control back to the driver. An electronic shift involves disengaging the gear currently engaged and verifying this operation, synchronizing the engine speed to the transmission tailshaft speed for engagement of the requested gear, and verifying the requested gear is engaged before returning throttle control to the driver. The control algorithm that forms a part of the present invention provides a highly reliable mechanism for assisting gear engagement prior to returning throttle control to the driver in the above shift sequence.

SUMMARY OF THE INVENTION

According to one aspect of the present invention, a method of assisting automatic gear engagement after detecting gear disengagement in a vehicle having an engine with a throttle capable of operator control and of being inhibited from operator control, and a manual/automatic transmission including manually selectable gears and a plurality of automatically selectable gears is provided. The method comprising the steps of: (1) calculating a synchronous RPM value corresponding to a desired engine speed at which an ensuing automatic gear shift will take place, (2) inhibiting throttle control by the operator and fueling the engine to achieve an engine speed within a first predetermined RPM range of the synchronous RPM, (3) commanding the transmission to engage a desired one of the automatically selectable gears, (4) returning throttle control to the operator if the transmission has engaged the desired one of the automatically selectable gears before a first predetermined time period has elapsed, (5) performing steps (6)–(7) if throttle control is not returned to the operator after step (4) is completed, (6) fueling the engine to achieve an engine speed of approximately a first predetermined deviation from the synchronous RPM value, (7) returning throttle control to the operator if the transmission has engaged the desired one of the automatically selectable gears before a second predetermined time period has elapsed, (8) performing steps (9)–(10) if throttle control is not returned to the operator after step (7) is completed, (9) fueling the engine to achieve an engine speed of approximately a second predetermined deviation from the synchronous RPM value, and (10) returning throttle control to the operator if the transmission has engaged the desired one of the automatically selectable gears before a third predetermined time period has elapsed.

According to another aspect of the present invention, a control device for use with a motor vehicle having an engine with a throttle capable of operator control and of being inhibited from operator control, and a manual/automatic transmission including a gear selection input and further having a manual gear selection mode of operation and an automatic gear shift mode of operation including at least two automatically selectable gears is provided. The device comprises means for detecting gear disengagement when the engine is disengaged from the transmission, means for detecting gear engagement when the engine is engaged to the transmission, and processor means for assisting the engagement of automatically selectable gears of the manual/automatic transmission. The processor means is responsive to the means for detecting gear disengagement to inhibit the throttle from operator control and govern the engine speed to a first predetermined RPM level after gear disengagement is detected. The processor means further provides a gear selection signal to the gear selection input of the transmission to command one of the automatically selectable gears when the engine speed is within a first predetermined RPM range of said first RPM level. The processor means is thereafter responsive to the means for detecting gear engagement and returns throttle control back to the operator if gear engagement is detected within a first predetermined time period. If gear engagement is not detected within the first time period, the processor means governs the engine speed to a second predetermined RPM level and returns throttle control to the operator if gear engagement is detected within a second predetermined time period. If gear engagement is not detected within the second time period, the processor means governs the engine speed to a third predetermined RPM level and returns throttle control to the operator if gear engagement is detected within a third predetermined time period. Finally, if gear engagement is not detected within the third time period, the processor means governs the engine speed to the first predetermined RPM level and returns throttle control to the operator if gear engagement is detected within a fourth predetermined time period.

According to yet another aspect of the present invention, a control device for use with a motor vehicle having an engine with a throttle capable of operator control and of being inhibited from operator control, and a manual/automatic transmission including a gear selection input and further having a manual gear selection mode of operation and an automatic gear shift mode of operation including at least two automatically selectable gears is provided. The device comprises means for detecting gear disengagement when the engine is disengaged from the transmission, means for detecting gear engagement when the engine is engaged to the transmission, means for detecting tailshaft speed and providing a tailshaft speed signal corresponding to said tailshaft speed, means for detecting engine speed and providing an engine speed signal corresponding to said engine speed, fueling means for providing fuel to the engine in accordance with signals supplied to the fueling means, and processor means for assisting the engagement of one of the automatically selectable gears of the manual/automatic transmission. The processor means includes a first input for receiving the tailshaft speed signal, a second input for receiving the engine speed signal, a first output for providing fueling signals to the fueling means, and a second output for providing a gear selection signal to the gear selection input of the transmission. The processor means is responsive to the means for detecting gear disengagement to inhibit the throttle from operator control and govern the engine speed to the synchronous RPM level after gear disengagement is detected. The processor means governs the engine speed to the desired synchronous RPM level by providing signals to the fueling means to synchronize the engine speed with the tailshaft speed to thereby permit engagement of the desired gear. The processor means further provides the gear selection signal to the gear selection input of the transmission to command one of the automatically selectable gears when the engine speed is within a first predetermined RPM range of the synchronous RPM level. The processor means is thereafter responsive to the means for detecting gear engagement by returning throttle control to the operator if gear engagement is detected within a first predetermined time period. If gear engagement is not detected within the first time period, the processor means governs the engine speed to a second predetermined RPM level and returns throttle control to the operator if gear engagement is detected within a second predetermined time period If gear engagement is not detected within the second predetermined time period, the processor means governs the engine speed to a third predetermined RPM level and returns throttle control to the operator if gear engagement is detected within a third predetermined time period.

According to a further aspect of the present invention, a control device for use with a motor vehicle having an engine with a throttle capable of operator control and of being inhibited from operator control, and a manual/automatic transmission including a gear selection input and further having a manual gear selection mode of operation and an automatic gear shift mode of operation including at least two automatically selectable gears is provided. The device comprises means for detecting gear disengagement when the engine is disengaged from the transmission, means for detecting gear engagement when the engine is engaged to the transmission, and processor means for assisting the engagement of automatically selectable gears of the manual/automatic transmission. The processor means is responsive to the means for detecting gear disengagement to inhibit the throttle from operator control and govern the engine speed to a first predetermined RPM level after gear disengagement is detected. The processor means further provides a gear selection signal to the gear selection input of the transmission, the gear selection signal corresponding to either an upshift signal or a downshift signal. The upshift signal commands a higher automatically selectable gear when the engine speed is within a first predetermined RPM range above the first RPM level, and the downshift signal commands a lower automatically selectable gear when the engine speed is within the first predetermined RPM range below the first RPM level. The processor means is thereafter responsive to the means for detecting gear engagement by returning throttle control to the operator if gear engagement is detected within a first predetermined time period. If gear engagement is not detected within the first time period, the processor means governs the engine speed to a second predetermined RPM level and returns throttle control to the operator if gear engagement is detected within a second predetermined time period. The second RPM level is greater than the first RPM level when the gear selection signal corresponds to an upshift signal, and less than the first RPM level when the gear selection signal corresponds to a downshift signal. If gear engagement is not detected within the second time period, the processor means governs the engine speed to a third predetermined RPM level and returns throttle control to the operator if gear engagement is detected within a third predetermined time period. The third RPM level is less than the first RPM level when the gear selection signal corresponds to an upshift signal, and greater than the first RPM level when the gear selection signal corresponds to a downshift signal. Finally, if gear engagement is not detected within the third time period, the processor means governs the engine speed to the first predetermined RPM level and returns throttle control to the operator if gear engagement is detected within a fourth predetermined time period.

One object of the present invention is to provide a method for assisting transmission gear engagement during an electronic automatic shift.

Another object of the present invention is to provide a device for altering the RPM level of a vehicle engine from a synchronous RPM level pursuant to an ensuing shift to assist the engagement of a vehicle transmission to the vehicle engine during an electronic automatic shift.

A further object of the present invention is to provide a method and device to rock vehicle transmission gears into engagement with the vehicle engine by altering the RPM level of the engine periodically between the synchronous RPM +/− a delta RPM for an upshift and downshift respectively, and the synchronous RPM −/+ a delta RPM for an upshift and downshift respectively.

BRIEF DESCRIPTION OF THE DRAWINGS

FIG. 7 is a graph of engine RPM versus time for an upshift sequence.

FIG. 8 is a graph of engine RPM versus time for a downshift sequence.

DESCRIPTION OF THE PREFERRED EMBODIMENT

Figure 1:
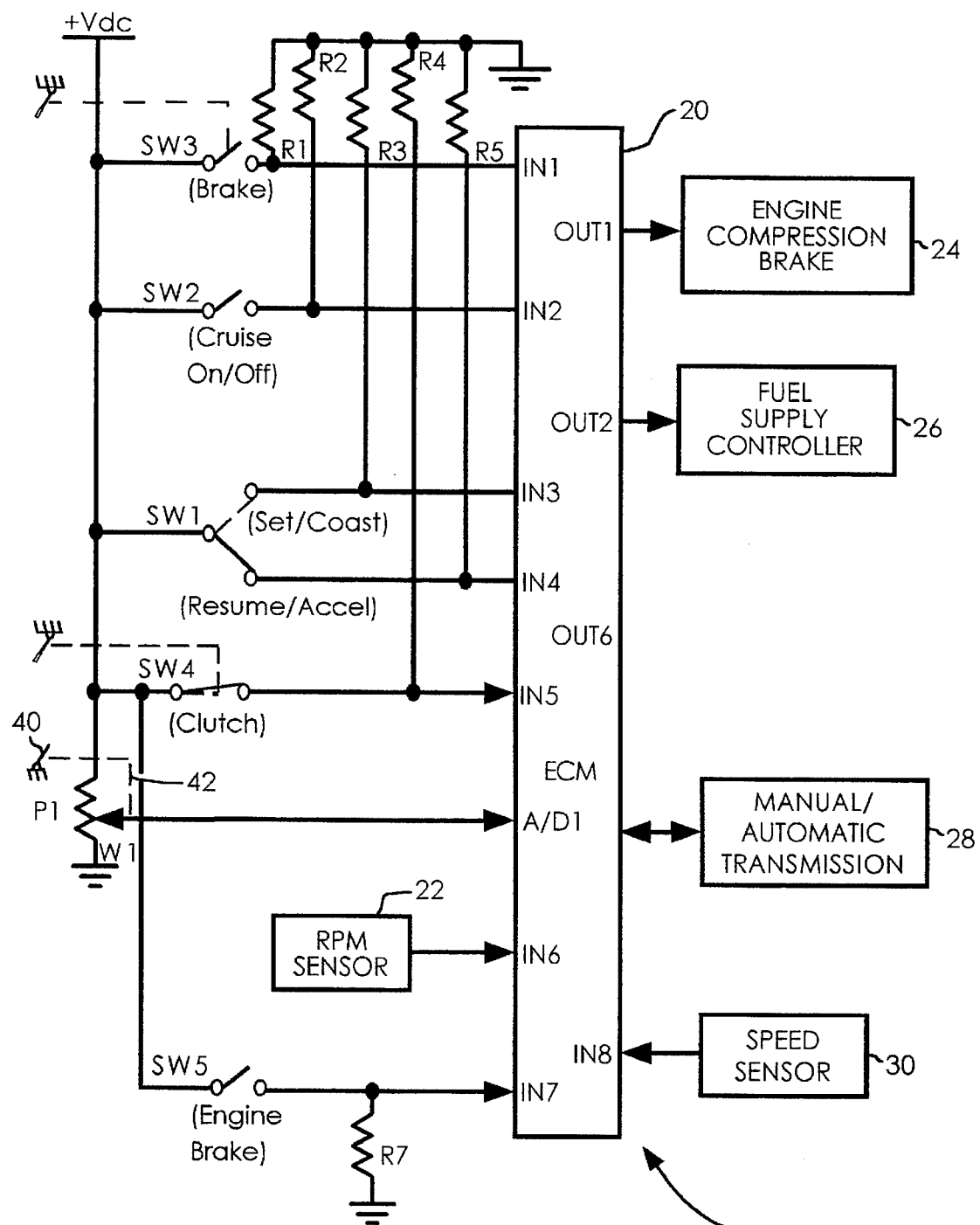
FIG. 1 is a diagrammatic illustration of an electronic controller consistent with the teachings of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, a diagrammatic illustration of a control system 15 according to the present invention is shown. The control system 15 includes as its central component electronic control module (ECM) 20. ECM 20 is a microcomputer including a microprocessor having memory including ROM and RAM and a plurality of inputs and outputs (I/O) in addition to interface circuits for I/O interfacing. The ROM portion of ECM 20 may further include EPROM, EEPROM, Flash PROM and any other reusable type of read-only-memory known to those skilled in the art. The input signals supplied to ECM 20 are produced by various switches and sensors which respond to operating conditions of the engine and vehicle, and inputs from the driver.

Switches SW1 and SW2 are mounted in the driver's cab or driver compartment and provide the driver with a means for turning the cruise control functions on and off, via switch SW2, and for establishing a desired cruise speed via switch SW1, as well as permitting the vehicle to coast without cruise control operation. Switch SW1 also provides input signals to activate resume/acceleration features well known in the art of cruise control systems. Switch SW2 enables cruise control operation while switch SW1 is used to activate the operational modes of the cruise control system built into the software of ECM 20. Switch SW1 is a momentary center-off SPDT switch. The set/coast cruise control function is activated by shorting input IN3 of ECM 20 to logic high voltage, or +$V_{DC}$. This is accomplished by closing switch SW1 and connecting +$V_{DC}$ to the signal path connected to resistor R3 and input IN3. In the alternative, when switch SW1 is actuated to connect input IN4 and resistor R5 with +$V_{DC}$, input IN4 is raised to a logic high and the ECM 20 is informed that the driver is actuating the resume or acceleration features of the cruise control system.

Switch SW5 is a driver-operated switch which provides an input signal to the ECM 20 regarding the operating state (on/off) of the engine compression brake desired by the driver. Switch SW5 is a normally open switch which, when closed, supplies a high logic signal level to input IN7 of ECM 20 indicating engine brake operation is desired. When switch SW5 is open, resistor R7 pulls input IN7 to logic low or ground, thereby providing ECM 20 with a logic low signal corresponding to a driver request to disable or discontinue engine brake operation.

Accelerator pedal 40 is mechanically coupled, via linkage 42 to the wiper W1 of potentiometer P1. The wiper W1 is connected to an analog to digital (A/D) converter input A/D1 of ECM 20. The position of accelerator pedal 40 corresponds directly to the voltage present on wiper W1. Although potentiometer P1 is connected at one terminal to +$V_{DC}$ and at the other terminal to ground, the voltage present on wiper W1 ranges between a window of (ground+ deltav1) and (+$V_{DC}$–deltav2), where deltav1 and deltav2 represent voltage offsets. In this application, when accelerator pedal 40 is in the throttle closed or non-depressed position, the voltage present on wiper W1 is below a predetermined voltage corresponding to a throttle closed position. If the wiper W1 voltage is above a predetermined voltage, it is considered by the ECM 20 to be an indicator that the throttle is open. Throttle control by the operator, including cruise control operation, may be inhibited by the ECM 20 and thereafter controlled by the ECM 20.

Output OUT1 of ECM 20 supplies a signal to engine compression brake 24 which is a part of the engine of the vehicle (not shown), to provide engine compression braking operation as is well known in the operation of heavy duty trucks.

Output OUT2 of ECM 20 provides continuously variable signals which control the fuel supply controller 26. The continuously variable signals supplied to fuel supply controller 26 enable ECM 20 to fuel the engine of the vehicle to any particular rpm (revolutions per minute) desired. Under normal vehicle operation, the throttle is controlled by the driver via the accelerator pedal 40. In this normal mode of operation, the fuel supply controller 26 is actuated in response to driver demand. However, throttle control by the driver is capable of being inhibited by the ECM 20 so that the ECM 20 may control the fuel supply controller 26 to fuel the engine in certain situations to be more fully discussed hereinafter. Fuel supply controller may take the form of a fuel shut-off valve, fuel injectors or other fueling mechanisms responsive to electronic signals for controlling fuel supply rates to an engine.

Speed sensor 30 and RPM sensor 22 supply signals to ECM 20 indicative of the vehicle speed and engine speed, respectively. RPM sensor 22 supplies a pulse train signal to input IN6 of ECM 20. The pulse train signal supplied to input IN6 is monitored by ECM 20 to determine engine RPM speed. Similarly, the speed sensor 30, which detects tail shaft or drive shaft rotational speed, provides a similar pulse train signal to input IN8 of ECM 20 wherein the frequency of the pulse train delivered to ECM 20 indicates the speed of rotation of the output shaft of the transmission 28 or the drive shaft of the vehicle drive train.

The manual automatic transmission 28 is connected via various signal path lines to ECM 20. The interface between ECM 20 and manual/automatic transmission (MAT) 28 is more specifically shown for two different transmission embodiments in FIGS. 2 and 3, respectively. The I/O interface between ECM 20 and MAT 52 shown in FIG. 2 includes a gear engagement status logic feedback signal supplied to input IN10 as well as an automatic shift-mode request switch SW6 that supplies a logic signal to input IN11 indicating whether automatic gear shifting operation is desired. Switch SW6 is actuated in response to driver positioning of gearshift lever 50. Gear shift lever 50 is coupled to switch SW6 via actuator linkage 54. Resistor R6 maintains the logic signal present at input IN11 of ECM 20 at a logic high whenever normally open switch SW6 is not closed. When switch SW6 is closed, the logic signal present at input IN11 is at a logic low level. Gear selection logic signals supplied to outputs OUT3 and OUT4 of ECM 20 control the actuation of sixth gear and seventh gear solenoid actuators (not shown) of the MAT 52 to thereby select six and seventh gears respectively. MAT 52 is a Spicer transmission Model No. AS125-7 manufactured by Spicer, a subsidiary of Dana Corporation.

The signal supplied from MAT 52 to input IN10 of ECM 20 is a logic signal indicating that MAT 52 is in a neutral (no gears engaged) operational state when the signal is at a logic low level. When the signal supplied to input IN10 of ECM 20 from MAT 52 is a logic high signal, an "in-gear" condition of operation of MAT 52 is indicated. The signal supplied to input IN10 does not indicate which automatically selectable gear ratio operation state is currently engaged. Nevertheless, ECM 20 is aware of the logic output levels at outputs OUT3 and OUT4. Thus, ECM 20 can determine whether MAT 52 was attempted to be placed into sixth gear automatic operation state or seventh gear automatic operation state by the status of outputs OUT3 and OUT4. Whether MAT 52 actually engaged six or seventh gear, however, must be determined via the gear confirmation, or gear verification, process in conjunction with the gear engagement process forming a part of the present invention. Automatic gear shifting thus occurs in the "top two" gears according to shift algorithms contained within the ECM 20.

Figure 4:
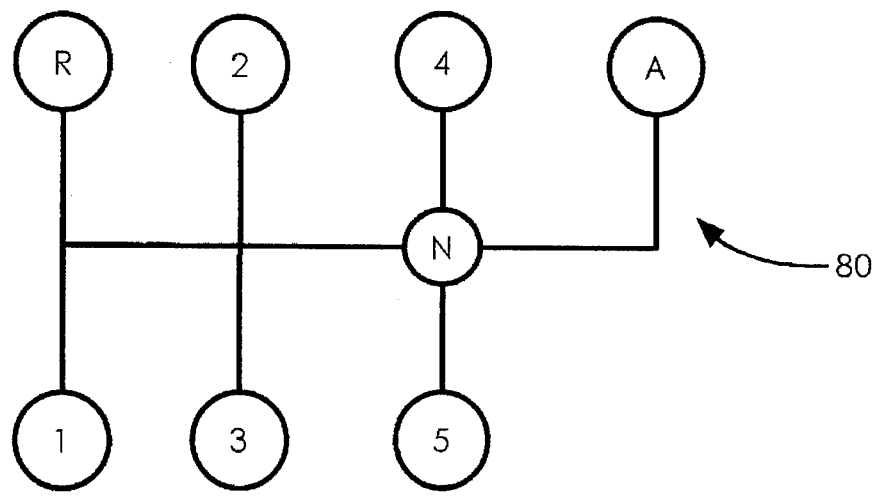
FIG. 4 is a diagrammatic illustration of the shift pattern for a Dana Spicer 7-speed heavy duty truck transmission.

Switch SW6 is actuated only when shift lever 50 is placed into the automatic operation mode position depicted by the shift position A in FIG. 4 wherein automatic actuation of sixth and seventh gear is requested by the driver of the vehicle. The other shift lever positions of FIG. 4 correspond to the reverse, first, second, third, fourth, and fifth gear ratio operation states which are manually selectable or engageable by the driver.

Figure 3:
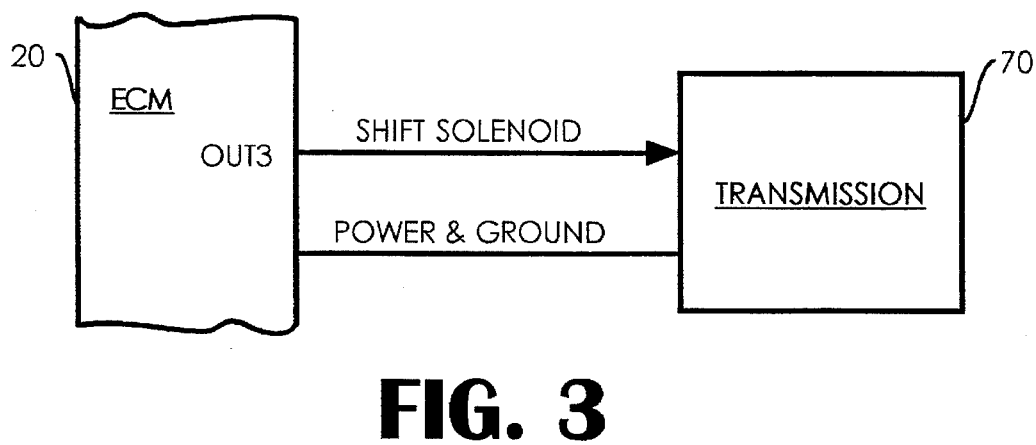
FIG. 3 is another embodiment of the control interface between engine control module and transmission of FIG. 1.
Figure 5:
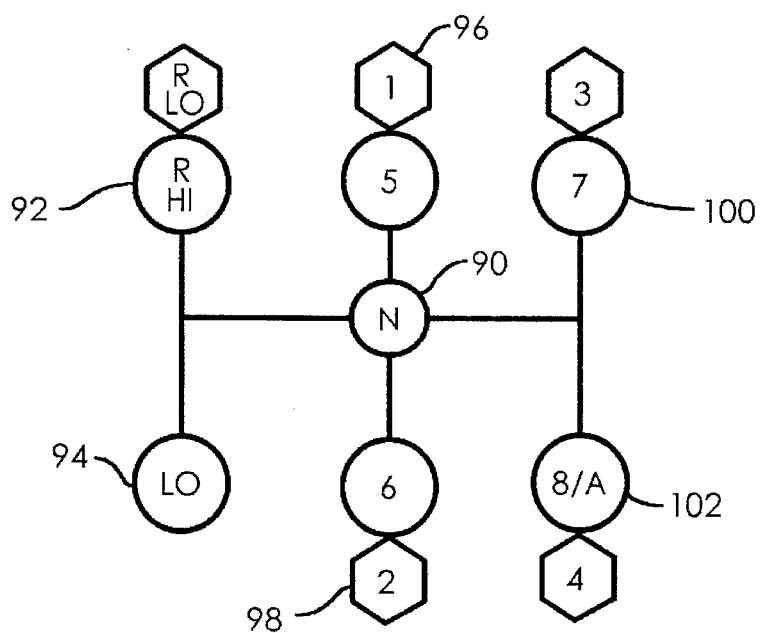
FIG. 5 is a diagrammatic illustration of an Eaton Fuller heavy duty truck transmission shift pattern.

In an alternative transmission embodiment shown in FIG. 3, ECM 20 is electronically connected to and interfaced with MAT 70, an Eaton/Fuller, Inc. transmission model RTT 12609A. The only I/O interface signal required between MAT 70 and ECM 20 is an output signal from output OUT3 supplied to the splitter gear box electro-pneumatic solenoid actuator (not shown) of MAT 70. The splitter gear box of MAT 70 provides an overdrive gear ratio when the MAT 70 is in the highest speed gear operation state. This is further illustrated in FIG. 5 by the gearshift pattern shown which corresponds to the Eaton/Fuller MAT 70. Neutral is found at position 90. Reverse gears are selectable at position 92 and forward gear ratio operational states that are manually selectable are shown at positions 94, 96, 98, 100, and 102. Once the driver has shifted manually through the gears according to the shift order of low, one, two, three, four, five, six, seven, and finally shifted the MAT 70 into the manual gearshift position labeled 8/A, the automatic shifting function of the ECM software is activated to supply a gear request signal at output OUT3 of ECM 20 to shift back and forth between high split and low split to thereby provide an overdrive final drive ratio or higher speed capability gear ratio for MAT 70. Thus, at location 102 the position labeled 8/A is the last manually selected gear position during the manual gear shifting phase of vehicle operation prior to the engagement or selection of automatic shift-mode operation.

The Eaton/Fuller embodiment of the present invention does not require switch SW6 since the auto-shift mode is detected, through software, by comparing engine speed and tailshaft speed. If the ratio of engine speed to tailshaft speed is within a predetermined ratio range, ECM 20 recognizes that the driver has shifted MAT 70 into position 102 in FIG. 5. Thereafter, until the ratio of engine speed to tailshaft speed falls outside the predetermined ratio range, ECM 20 controls the "top two" gears of MAT 70 according to shift algorithms forming a part of the ECM 20 software.

Even though the splitter does not have a true neutral state, there is a point where the splitter is neither in low or high split (ie. disengaged). Disengagement is detected if the engine speed, detected at input IN6 of the ECM 20, is outside of a disengagement window defined as a predetermined delta1 RPM level above or below the tailshaft speed, detected at input IN8 of the ECM 20. Typically, delta1 is approximately 150 RPM, but the present invention contemplates delta1 RPM levels between approximately 50 RPM and 500 RPM. "Neutral" in the MAT 70 application is thus detected by software.

Before disengagement of the current gear may be attempted, confirmation of engagement of the current gear is required. An "in-gear" condition exists if the engine speed, detected at input IN6 of the ECM 20, is within a gear engagement window, defined as a predetermined delta2 RPM level above or below the tailshaft speed, detected at input IN8 of the ECM 20. Typically, delta2 is approximately 150 RPM, but the present invention contemplates delta2 RPM levels between approximately 5 RPM and 500 RPM.

Although the interface between MAT 52 and ECM 20 versus the interface between MAT 70 and ECM 20 are substantially different, the operational features are significantly similar when either MAT 52 or 70 is placed into the automatic shift-mode operation state wherein the "top two" final drive gear ratio operation states are automatically selected by the ECM 20. Two electro-pneumatic solenoid valves (not shown) are actuated by logic signals supplied to output OUT3 and Output OUT4 of ECM 20 in FIG. 2 to engage sixth gear, seventh gear or neutral operation mode of MAT 52. Pressurized air and air cylinder(s) (not shown) within the MAT 52 or 70 supply the automatic shift mode gear engaging action according to the position of the solenoid valve(s).

One electro-pneumatic solenoid valve is required to operate the splitter of MAT 70 shown in FIG. 3. Thus, the signal supplied to output OUT3 actuates an electro-pneumatic solenoid valve (not shown) which actuates the splitter of MAT 70. The embodiments shown in FIG. 2 and FIG. 3 both include power and ground signals supplied via signal path 58 between the ECM 20 and the MATs 52 and 70.

Figure 2:
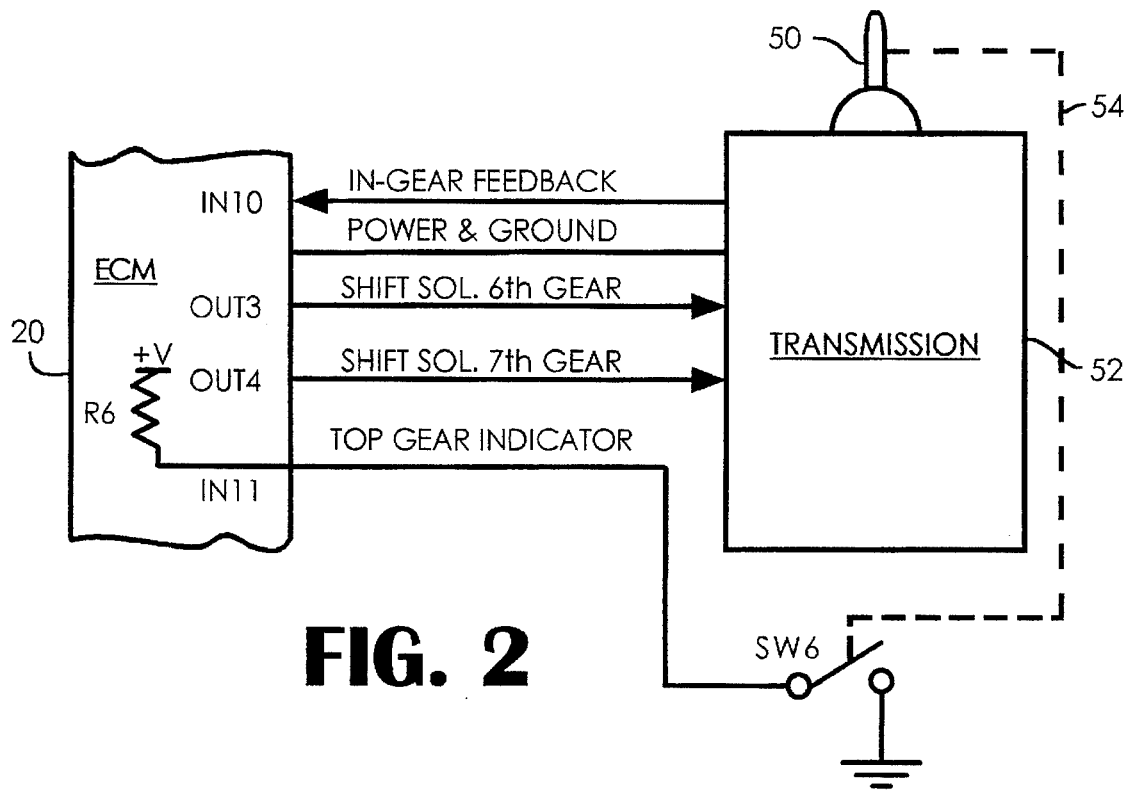
FIG. 2 is a diagrammatic illustration of one embodiment of the engine control module to manual/automatic transmission control interface.
Figure 6:
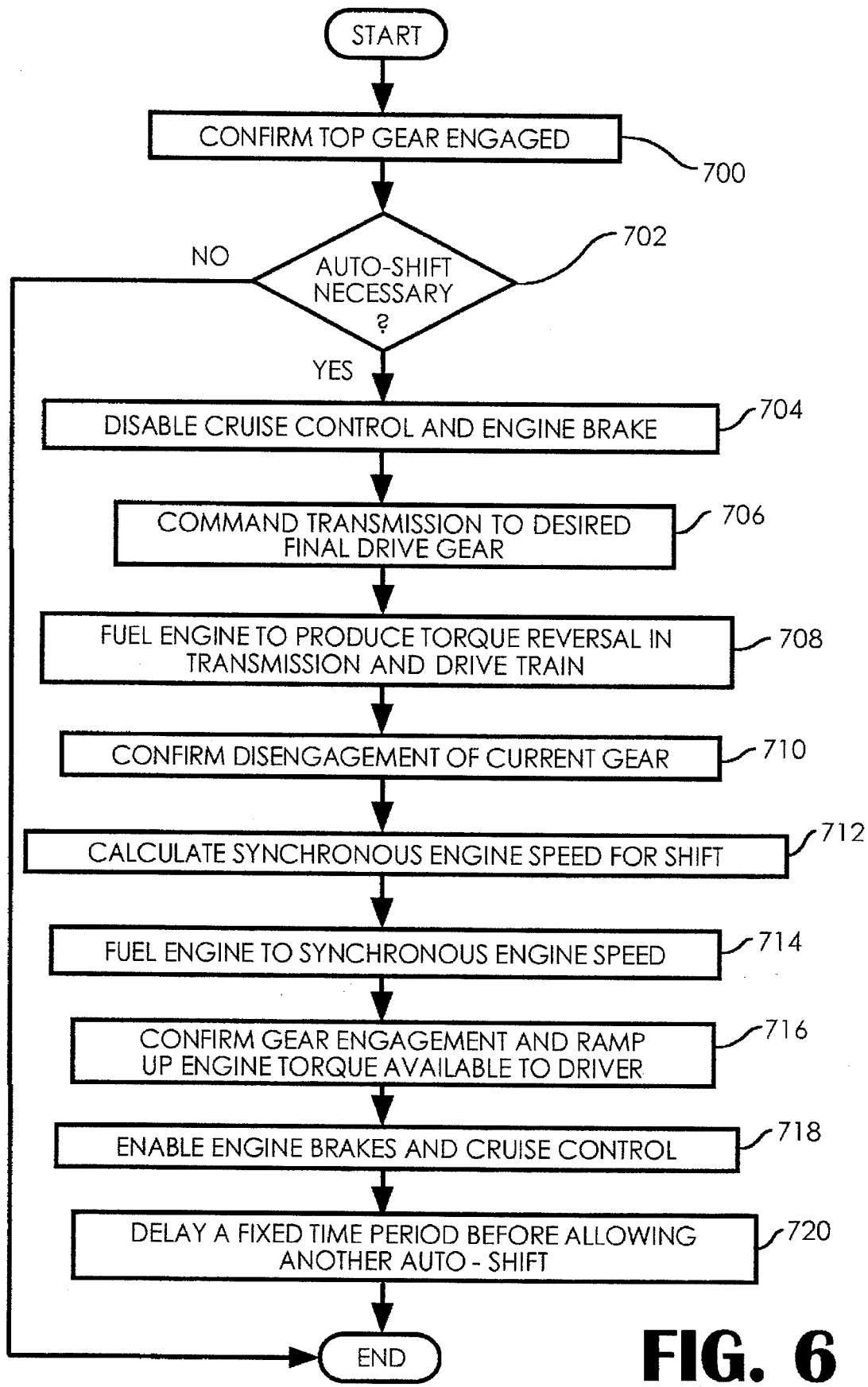
FIG. 6 is a flowchart of an auto-shift sequence according to the present invention.

Operationally speaking, an auto-shift to be performed in the top two gears of the system shown in FIG. 1 and FIG. 2 or FIG. 3 includes the following sequence of events (and is reflected in the flowchart of FIG. 6): (1) confirm that one of the top two gears is engaged, (step 700), (2) determine if an auto-shift is necessary, (step 702), (3) disable cruise control and engine brakes if active, (step 704), (4) command the transmission shift solenoid (or solenoids) to the requested gear, (step 706), (5) fuel the engine to produce a torque reversal in the transmission and drive train, (step 708), (6) confirm disengagement of the current gear, (step 710), (7) calculate synchronous engine speed to engage desired auto-shift gear ratio operation state, (step 712), (8) fuel engine to achieve synchronous engine speed, (step 714), (9) confirm gear engagement, (step 716), (10) ramp the engine torque available to the driver, (step 716), (11) return engine brakes and cruise control to their operational state prior to the auto-shift sequence initiation, (step 718), and (12) delay a fixed period of time before attempting another auto-shift (step 720).

A number of operational factors or conditions are monitored to determine whether to initiate or inhibit an auto-shift sequence. The ECM 20 continuously monitors the system inputs numerous times a second to determine whether or not an auto-shift sequence can be initiated. A preferred repetition time span is approximately 96 milliseconds, although other repetition time intervals are contemplated; that is the ECM 20 should determine whether an auto-shift condition is present and whether an auto-shift should be initiated every 96 milliseconds. An auto-shift is inhibited if any of the following conditions exist: (1) one of the Lop gears is not confirmed as engaged, which is a condition precedent for an automatic mode upshift or an automatic mode downshift, (2) vehicle speed is below a predetermined level, (3) the clutch pedal is depressed before or during the auto-shift process, (4) a shift delay has not elapsed since the previous auto-shift, and (5) other system faults which indicate to the ECM 20 that an automatic mode shift or auto-shift should not occur, such as speed sensor or RPM sensor failure, or other such hardware failures which prevent proper and safe operation of the auto-shift mode of operation. A manual-automatic transmission and engine control system as depicted in patent application Ser. No. 08/108,483, filed by Gregory R. White, et al., provides a more detailed description of the typical components in a manual-automatic transmission and electronic engine control system, as well as the considerations for determining when and whether to initiate or inhibit an auto-shift sequence, and is hereinafter incorporated by reference.

Referring now to FIGS. 7 and 8, a description of the process for assisting gear engagement according to the present invention will now be provided. Curve 310 describes the engine RPM versus time during upshift (FIG. 7) and downshift (FIG. 8) operations. Once the cruise control or the engine compression brake are inhibited by ECM 20, the gear currently engaged is disengaged pursuant to either an automatic upshift or automatic downshift commanded by ECM 20. When the ECM 20 detects gear disengagement, as previously discussed, the ECM 20 inhibits the throttle from operator control and governs the engine speed to a calculated synchronous RPM represented by the RPM level 312 on RPM curve 310. To achieve synchronous RPM 312, ECM 20 computes the fueling requirements to synchronize the engine speed, sensed at IN 6 with the transmission tailshaft speed or driveshaft rotational speed, sensed at IN 8, to allow engagement of the desired gear, inhibits throttle control by the operator, and commands the fuel supply control 26 to supply the fuel required to achieve synchronous RPM 312.

Once the engine RPM is within the synchronous window 314 defined as the synchronous RPM 312 plus a deviation W for an upshift as shown in FIG. 7, or the synchronous RPM 312 minus the deviation W for a downshift as shown in FIG. 8, one of the automatically selectable gears is requested by the ECM 20. An upshift signal commands a higher automatically selectable gear, such as when shifting from 6th gear automatic to 7th gear automatic, and a downshift signal commands a lower automatically selectable gear, such as when shifting from 7th gear automatic to 6th gear automatic. Typically, the deviation W is set at approximately 200 RPM, but the present invention contemplates deviations W of between approximately 50 RPM and 1000 RPM.

If an "in-gear" condition is detected, by techniques previously discussed, within a predetermined engagement time E1, then gear engagement is confirmed (verified) and throttle control is returned to the operator. Although E1 is typically set at approximately 500 milliseconds, the present invention contemplates E1 times of between approximately 10 milliseconds and 2.0 seconds. The engagement time period E1 typically begins when the processor provides the gear selection signal, although the present invention contemplates E1 beginning times coinciding with other events such as calculating the synchronous RPM 312 or inhibiting throttle control by the operator, for example.

If an "in-gear" condition is not achieved within the engagement time E1, the engine RPM is altered for a second predetermined engagement time period E2. Specifically, the engine RPM is increased by the deviation R1, as shown in FIG. 7, if the ECM 20 has requested an upshift. If ECM 20 has requested a downshift, the engine RPM is decreased by the deviation R1 as shown in FIG. 8. Typically, R1 is set at 200 RPM and E2 is set at 64 milliseconds, but the present invention contemplates R1 values of between 50 RPM and 1000 RPM, and engagement times E2 ranging from between 5 milliseconds and 500 milliseconds. If an "in-gear" condition is achieved within the engagement time E2, then gear engagement is confirmed and throttle control is returned to the operator. The engagement time period E2 typically begins when the ECM 20 has governed the engine speed to the synchronous RPM value $312 \pm R1$. However, the present invention contemplates measuring E2 from other significant events as well including, for example, when the processor provides the gear selection signal, calculates the synchronous RPM 312 or inhibits throttle control by the operator.

If gear engagement is not confirmed within the engagement time E2, the engine RPM is altered for the duration of a third engagement time period E3. Specifically, if the ECM 20 has requested an upshift, the engine RPM is reduced by the deviation R2 below the synchronous RPM 312. If the ECM 20 has requested a downshift, the engine RPM is increased by the deviation R2 above the synchronous RPM 312 for the duration E3. Typically, R2 is set at 200 RPM and E3 is set at 16 milliseconds, but the present invention contemplates R2 values of between 50 RPM and 1000 RPM, and engagement time periods E3 ranging between 5 milliseconds and 500 milliseconds. If an "in-gear" condition is achieved within the engagement time period E3, then gear engagement is confirmed and throttle control is returned to the operator. Typically, the engagement time period E3 begins coincident with the governing of the engine speed by the ECM 20 to the synchronous RPM value $312 \pm$ the deviation R2. However, the present invention contemplates measuring E3 from other events as well such as, for example, when the processor provides the gear selection signal, calculates the synchronous RPM 312, inhibits throttle control by the operator, or governs the engine speed to the synchronous RPM value $312 \pm$ the deviation R1.

Finally, if gear engagement is not confirmed within the engagement time period E3, the engine RPM is returned to within the window W of the synchronous RPM 312. If an "in-gear" condition is achieved within a fourth predetermined engagement time E4 after returning the engine RPM to the synchronous RPM level 312, then gear engagement is confirmed and throttle control is returned to the operator. Typically, the engagement time E4 is set at 500 milliseconds, but the present invention contemplates E4 times ranging between 10 milliseconds and 1.5 seconds. Alternatively, the engagement time $E_R$ may be used in place of E4 as a measure of time delay in waiting for gear engagement. In this embodiment, if, after the engine RPM is returned to within the window W of the synchronous RPM 312, an "in-gear" condition is achieved within the engagement time $E_R$ after the engagement time E1 has elapsed, (coinciding with the governing of the engine speed to the synchronous RPM 312±the deviation R1) then gear engagement is confirmed and throttle control is returned to the operator. Typically, the engagement time $E_R$ is set at approximately 500 milliseconds, but $E_R$ times of between 10 milliseconds and 2.0 seconds are contemplated by the present invention. If an "in-gear" condition is not achieved after the engagement time E4 (or $E_R$ in an alternative embodiment) has elapsed, the ECM 20 executes an error recovery routine which synchronizes the engine RPM to the tailshaft speed or drive shaft rotational speed to reengage the previous gear, and the returns throttle control to the driver. The present invention further contemplates measuring E4 from other events as well such as, for example, when the processor provides the gear engagement signal, calculates the synchronous RPM 312, inhibits throttle control by the operator, or governing the engine speed to the synchronous RPM±the deviation R2.

From the foregoing description, it is to be understood that the decrease and increase in engine RPM during the engagement times E2 and E3 are intended to rock the transmission gears into engagement within the engagement time $E_R$ as shown in FIGS. 7 and 8. This type of RPM "hunting" allows gear engagement to occur which might otherwise not be achieved merely by governing the engine to a synchronous RPM.

Figure 9A:
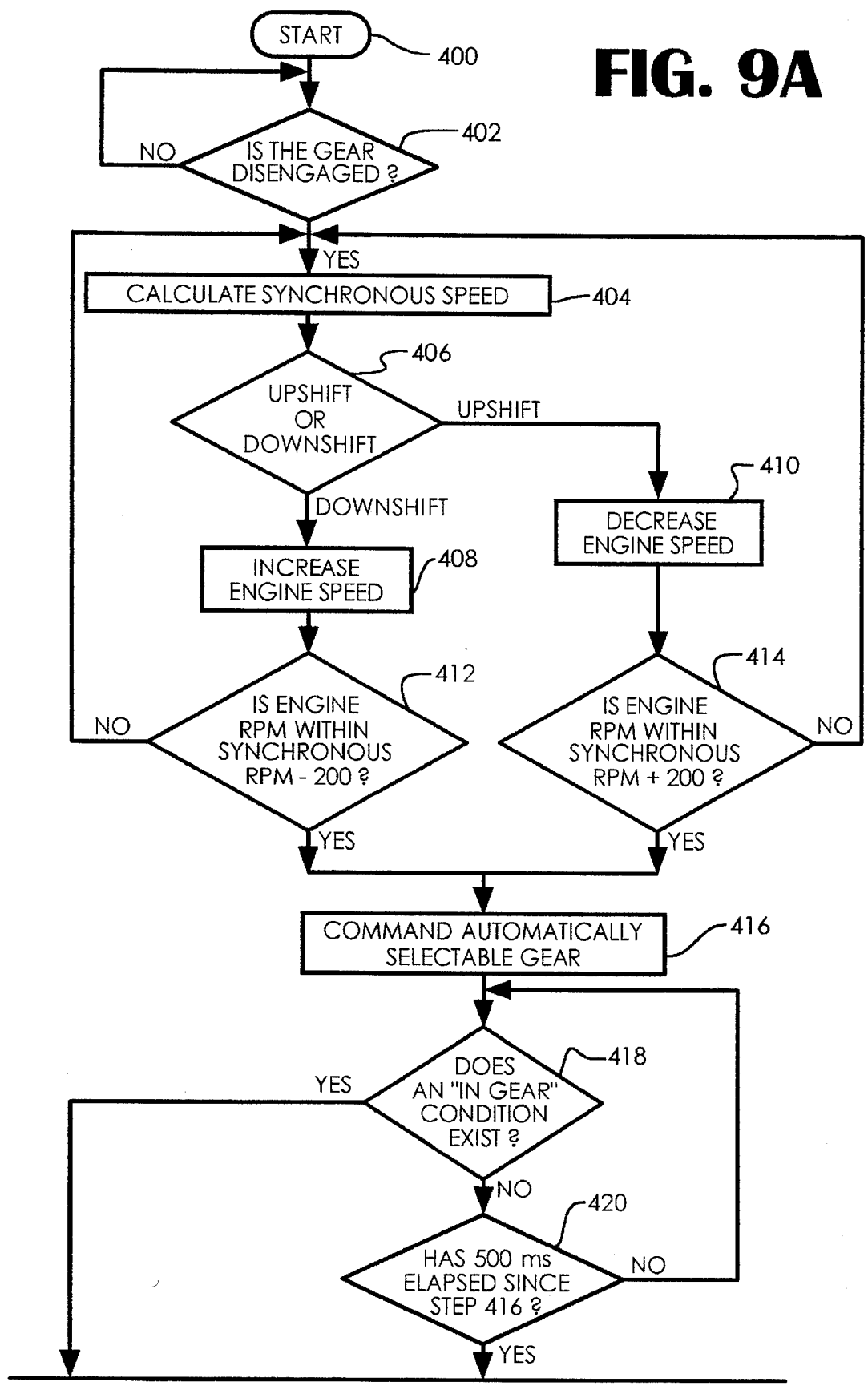
FIGS. 9A, 9B and 9C describe a flowchart of the algorithm for assisting gear engagement during an automatic shift of a manual-automatic transmission according to the present invention.
Figure 9B:
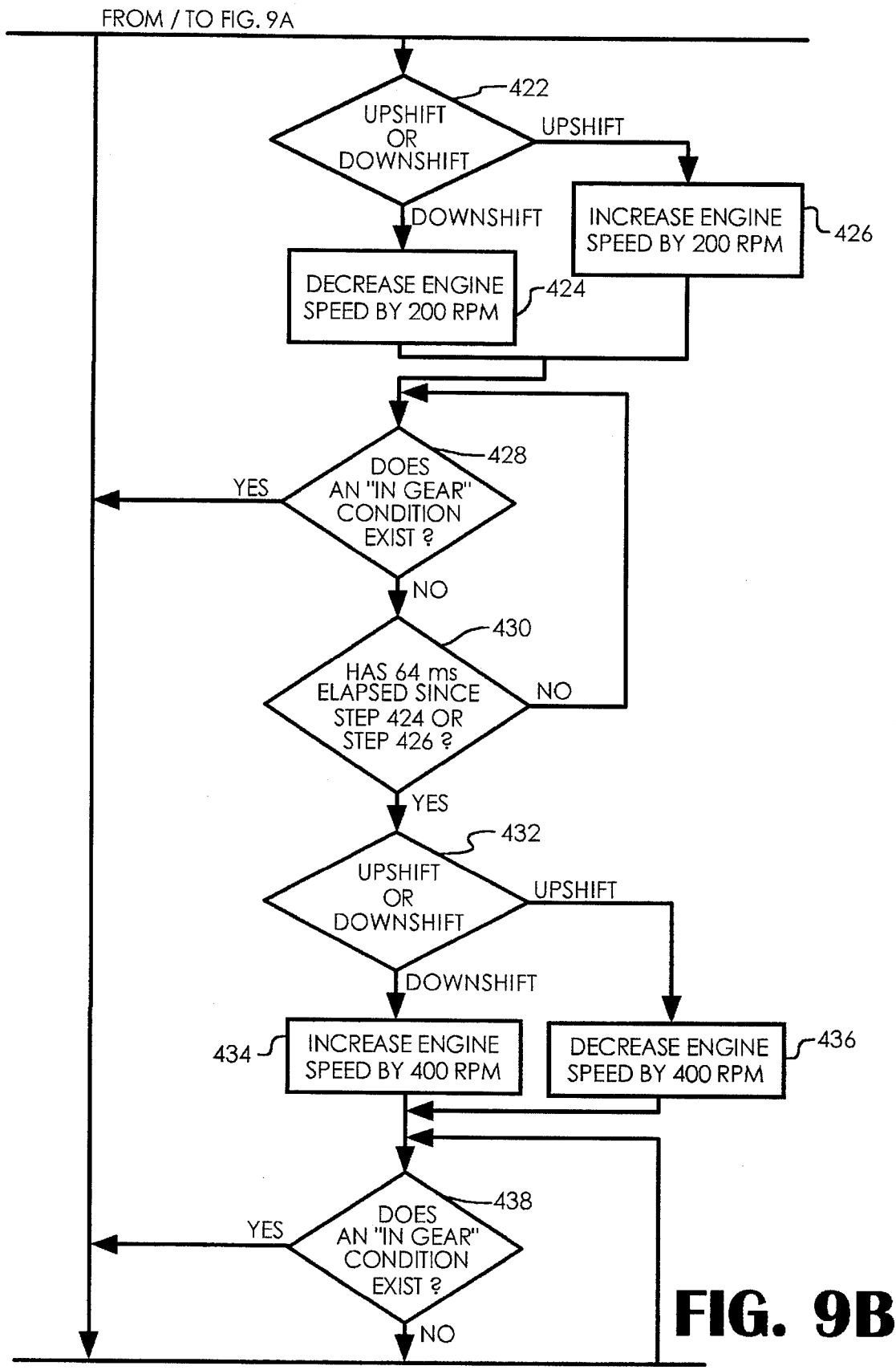
Figure 9C:
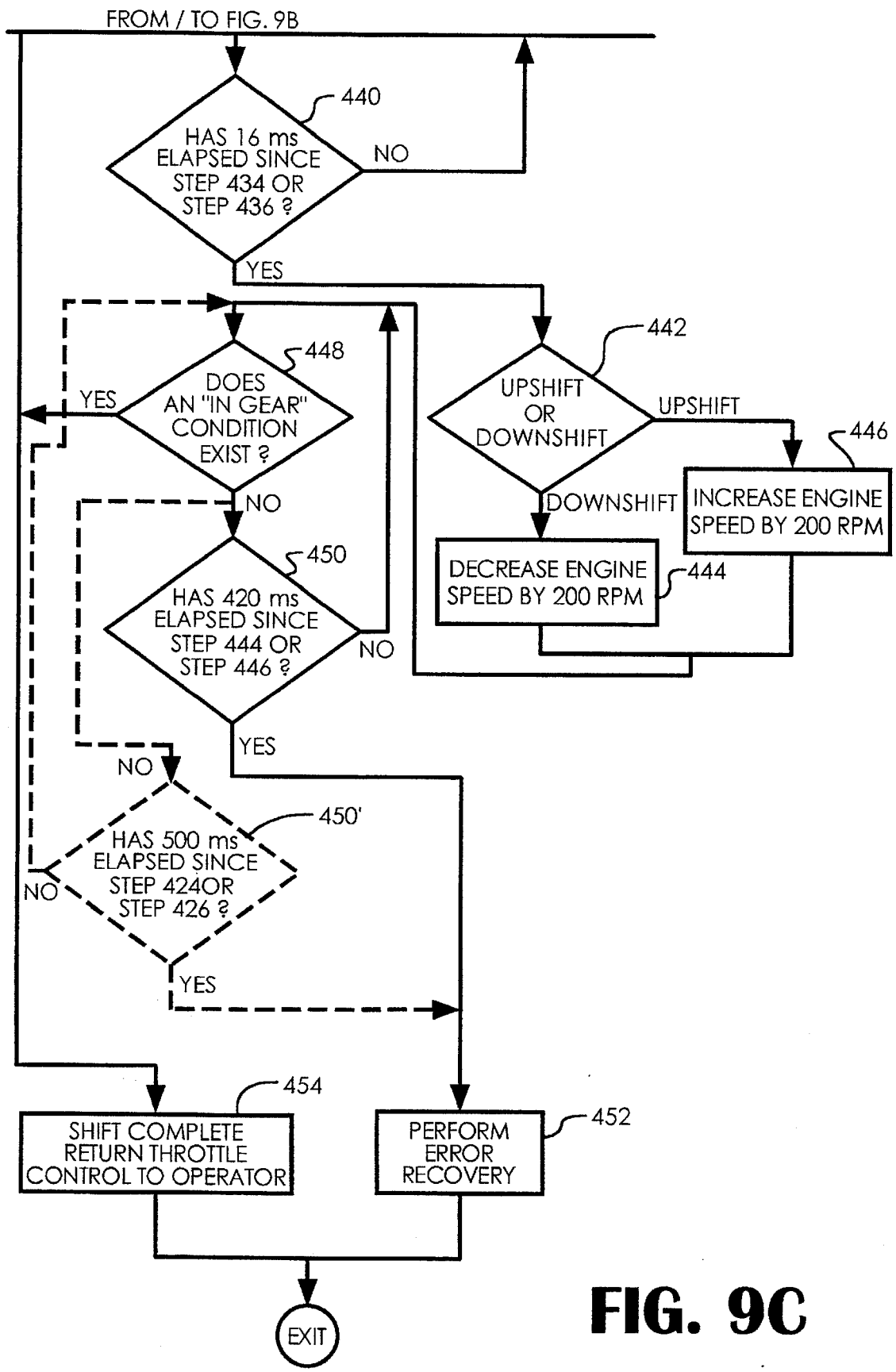

Referring now to FIGS. 9A, 9B and 9B, a flow chart for a preferred gear engagement assisting algorithm according to the present invention is shown. All numerical values described in relation to this flow chart represent typical values and other values are contemplated by this invention as elsewhere noted. The algorithm begins at step 400 and at step 402, if a gear of the manual-automatic transmission is engaged, then program execution will loop from step 400 to step 402 and back to step 400 continuously until a gear of the manual-automatic transmission becomes disengaged. If one of the automatically selectable gears is disengaged and detected as such at step 402, then program execution continues at step 404 wherein the ECM calculates the synchronous engine speed. At step 406, the ECM 20 determines whether an upshift or downshift into one of the automatically selectable gears has been requested. If a downshift has been requested, the ECM 20 attempts to achieve the calculated synchronous RPM by increasing engine speed at step 408. If the engine RPM, at step 412, is within the RPM window defined as the synchronous RPM calculated at step 404 minus 200 RPM, the ECM 20 may then command one of the automatically selectable gears at step 416. If the engine RPM is not within the synchronous RPM minus 200 RPM window at step 412, the algorithm returns to step 404 to calculate a new synchronous engine speed.

Returning now to step 406, if an upshift is requested, the ECM 20 attempts to achieve the calculated synchronous RPM by decreasing the engine speed at step 410. If, at step 414, the engine speed is within a second RPM window defined as the synchronous RPM calculated at step 404 plus 200 RPM, the ECM 20 may command one of the automatically selectable gears at step 416. If the engine speed is not within the synchronous RPM plus 200 RPM window at step 414, the algorithm returns to step 404 to calculate a new synchronous engine speed. In attempting to achieve the calculated synchronous engine speed at steps 408 and 410, the ECM 20 inhibits throttle control by the operator and controls the fuel supplied to the engine via the fuel supply controller 26.

After the ECM 20 commands one of the automatically selectable gears at step 416, the ECM 20 determines, at step 418, whether an "in-gear" condition exists. In one transmission embodiment of the present invention, step 418 involves determining the status of an "in-gear" feedback signal supplied to input IN 10 of the ECM 20. In another transmission embodiment, step 418 involves determining whether the engine RPM is within a predetermined tailshaft RPM window as previously explained. If an "in-gear" condition is determined at step 418, algorithm execution continues at step 454 where throttle control is returned to the operator before exiting the algorithm. If an "in-gear" condition is not detected at step 418, the ECM 20 determines, at step 420, whether 500 milliseconds has elapsed since commanding one of the automatically selectable gears at step 416. Until 500 milliseconds elapses, the algorithm continuously loops between steps 418 and 420, alternately checking whether an "in-gear" condition has been detected and, if not, whether 500 milliseconds has elapsed since commanding one of the automatically selectable gears at step 416. If, at any time before the 500 milliseconds elapses, an "in-gear" condition is detected, the algorithm exits the loop between steps 418 and 420, and advances to step 454 to return throttle control to the operator before exiting the algorithm.

If, at step 420, 500 milliseconds has elapsed since commanding one of the automatically selectable gears at step 416 and the ECM 20 has not detected an "in-gear" condition at step 418, the algorithm advances to step 422 and determines whether an upshift or downshift has been requested. If a downshift has been requested, the ECM 20 decreases the engine speed by 200 RPM by controlling the fuel supplied to the engine via the fuel supply controller 26. If, at step 422, the ECM 20 determines that an upshift was requested, the engine speed is increased by 200 RPM at step 426. After the engine speed has been set at step 424 or 426, the ECM 20 again determines, at step 428, whether an "in-gear" condition exists. If so, algorithm execution continues at step 454 where throttle control is returned to the operator before exiting the algorithm. If an "in-gear" condition has not been detected at step 428, the ECM 20 determines, at step 430, whether 64 milliseconds has elapsed since altering the engine speed at step 424 or 426. If 64 milliseconds has not elapsed, the algorithm loops to step 428 where the ECM 20 again checks whether an "in-gear" condition exists. The algorithm continues to loop between steps 428 and 430 if an "in-gear" condition is not detected within 64 milliseconds of altering the engine speed at step 424 or 426. If, at any time during this 64 milliseconds, an "in-gear" condition is detected at step 428, the algorithm advances to step 454 where throttle control is returned to the operator before exiting the algorithm.

If the ECM 20 determines that 64 milliseconds has elapsed at step 430 and an "in-gear" condition has not been detected, program execution continues at step 432 where the ECM 20 again determines whether an upshift or downshift was requested. If a downshift was requested, the engine speed is increased by 400 RPM at step 434. If, at step 432, the ECM determines that an upshift was requested., the engine speed is decreased by 400 RPM at step 436. After the engine speed is altered at steps 434 or 436, the ECM 20 again determines, at step 438, whether an "in-gear" condition has been detected. If so, program execution continues at step 454 where throttle control is returned to the operator before exiting the algorithm. If an "in-gear" condition is not detected at step 438, program execution continues at step 440 where the ECM determines whether 16 milliseconds has elapsed since altering the engine speed at steps 434 or 436. If 16 milliseconds has not elapsed, the algorithm loops back to step 438 where the ECM 20 again checks whether an "in-gear" condition has been detected. The algorithm continues to loop between steps 438 and 440 until either 16 milliseconds elapses or an "in-gear" condition is detected. If, at any time during the 16 milliseconds, an "in-gear" condition is detected at step 438, program execution continues at step 454 where throttle control is returned to the operator before exiting the algorithm.

If, at step 440, 16 milliseconds elapses without detecting an "in-gear" condition at step 438, program execution continues at step 442 where the ECM 20 again determines whether an upshift or downshift has been requested. If a downshift was requested, the ECM 20 decreases the engine speed by 200 RPM at step 444. If the ECM 20 determines, at step 442, that an upshift was requested, the engine speed is increased by 200 RPM at step 446. Altering the engine speed at steps 444 and 446 effectively returns the engine speed to its previous value of within the synchronous RPM window achieved at steps 412 or 414.

At step 448, the ECM 20 determines whether an "in-gear" condition has been detected. If so, program execution continues at step 454 where throttle control is returned to the operator before exiting the algorithm. If an "in-gear" condition is not detected at step 448, program execution continues at step 450 where the ECM 20 determines whether 420 milliseconds has elapsed since altering the engine speed at steps 444 or 446. Alternatively, step 450' may check whether 500 milliseconds has elapsed since originally altering the engine speed from its synchronous RPM value at steps 424 or 426. In either case, if the time delay of 420 milliseconds, or 500 milliseconds in an alternative embodiment, has not elapsed, the algorithm loops back to step 448 where the ECM 20 determines whether an "in-gear" condition has been detected. The algorithm continues to loop between steps 448 and 450 (or 450') until either the time delay of 420 milliseconds (or 500 milliseconds) has elapsed, or the ECM 20 determines that an "in-gear" condition has been detected. If an "in-gear" condition has been detected, program execution continues at step 454 where throttle control is returned to the operator before exiting the algorithm. If an "in-gear" condition has not been detected within the time delay of step 450 (or 450'), then step 452 is executed and error recovery is performed by the ECM 20 in order to prevent undesired operation of the engine and manual-automatic transmission system. Thereafter, the ECM 20 exits the algorithm.

One of the benefits of the above algorithm is that it forces gear engagement by reversing the torque in the driveline two different times. This results in more reliable shifts and reduces the amount of error recovery that would otherwise be required if gear engagement was not achieved merely by reaching the synchronous engine RPM.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method of assisting automatic gear engagement after gear disengagement in a vehicle having an engine with a throttle capable of operator control and of being inhibited from operator control, and a manual/automatic transmission including manually selectable gear ratios and a plurality of automatically selectable gear ratios, the method comprising the steps of:

inhibiting operator control of the throttle;

fueling the engine to achieve a synchronous engine speed;

commanding the transmission to engage one of the plurality of automatically selectable gear ratios;

increasing the engine speed to a first speed level above said synchronous engine speed;

decreasing the engine speed to a second speed level below said synchronous engine speed; and returning throttle control to the operator if the transmission engages said one of the plurality of automatically selectable gear ratios during execution of any of said commanding, increasing and decreasing steps.

2. The method of claim 1 further including the step of restoring the engine speed to said synchronous engine speed after said increasing and decreasing steps;

and wherein said returning step is further conditioned upon the transmission engaging said one of the plurality of automatically selectable gear ratios during execution of said restoring step.

3. The method of claim 2 further including the step of performing error recovery if throttle control is not returned to the operator during execution of any one of said commanding, increasing, decreasing and restoring steps.

4. The method of claim 1 wherein the vehicle further includes a rotatable tailshaft operatively connected to the transmission, and wherein the fueling step includes the steps of:

detecting tailshaft rotational speed;

calculating a target engine speed as an engine speed which is synchronized with said tailshaft rotational speed;

defining said synchronous engine speed as any engine speed within a first engine speed range of said target engine speed and fueling said engine to achieve said synchronous engine speed.

5. The method of claim 4 wherein said commanding step is an upshift command;

and wherein said first engine speed range is defined as an engine speed range between said target engine speed and a first engine speed deviation above said target engine speed.

6. The method of claim 5 wherein said commanding step is followed by said increasing step which is followed by said decreasing step.

7. The method of claim 6 wherein said increasing step is executed after expiration of a first time period since said engine speed has achieved said synchronous engine speed if the transmission has not engaged said one of the plurality of automatically selectable gear ratios during execution of said commanding step.

8. The method of claim 7 wherein said decreasing step is executed after expiration of a second time period since commencement of said increasing step if the transmission has not engaged said one of the plurality of automatically selectable gear ratios during execution of either of said commanding and increasing steps.

9. The method of claim 8 further including the step of fueling the engine to achieve said synchronous engine speed after expiration of a third time period since commencement of said decreasing step;

and wherein said returning step is further conditioned upon the transmission engaging said one of the plurality of automatically selectable gear ratios during execution of the step of fueling the engine to achieve said synchronous engine speed.

10. The method of claim 9 further including the step of performing error recovery after expiration of a fourth time period since commencement of the step of fueling the engine to achieve said synchronous engine speed if the transmission has not engaged said one of the plurality of automatically selectable gear ratios during execution of any of said commanding, increasing and decreasing steps.

11. The method of claim 4 wherein said commanding step is a downshift command;

and wherein said first engine speed range is defined as an engine speed range between said target engine speed and a first engine speed deviation below said target engine speed.

12. The method of claim 11 wherein said commanding step is followed by said decreasing step which is followed by said increasing step.

13. The method of claim 12 wherein said decreasing step is executed after expiration of a first time period since said engine speed has achieved said synchronous engine speed if the transmission has not engaged said one of the plurality of automatically selectable gear ratios during execution of said commanding step.

14. The method of claim 13 wherein said increasing step is executed after expiration of a second time period since commencement of said decreasing step if the transmission has not engaged said one of the plurality of automatically selectable gear ratios during execution of either of said commanding and decreasing steps.

15. The method of claim 14 further including the step of fueling the engine to achieve said synchronous engine speed after expiration of a third time period since commencement of said increasing step;

and wherein said returning step is further conditioned upon the transmission engaging said one of the plurality of automatically selectable gear ratios during execution of the step of fueling the engine to achieve said synchronous engine speed.

16. The method of claim 15 further including the step of performing error recovery after expiration of a fourth time period since commencement of the step of fueling the engine to achieve said synchronous engine speed if the transmission has not engaged said one of the plurality of automatically selectable gear ratios during execution of any of said commanding, decreasing and increasing steps.

17. The method of claim 1 wherein said commanding step is an upshift command;

and wherein said commanding step is followed by said increasing step which is followed by said decreasing step.

18. The method of claim 1 wherein said commanding step is a downshift command;

and wherein said commanding step is followed by said decreasing step which is followed by said increasing step.

19. A control apparatus for use with a motor vehicle having an engine with a throttle capable of operator control and of being inhibited from operator control, and a manual/automatic transmission including manually selectable gear ratios, a plurality of automatically selectable gear ratios and a gear selection input responsive to a gear selection signal to select one of the plurality of automatically selectable gear ratios, the apparatus comprising:

means for detecting gear disengagement and producing a gear disengagement signal when the engine is disengaged from the transmission;

means for detecting gear engagement and producing a gear engagement signal when the engine is engaged to the transmission; and processor means for assisting engagement of the engine with one of the automatically selectable transmission gear ratios, said processor means responsive to said gear disengagement signal to inhibit operator control of the throttle, govern engine speed to a synchronous engine speed and command one of the automatically selectable gear ratios of the transmission, said processor means thereafter monitoring said means for detecting gear engagement and, in the absence of said gear engagement signal, increasing engine speed to a first speed level above said synchronous engine speed value and decreasing engine speed to a second speed level below said synchronous engine speed value, and returning throttle control to the operator upon detection of said gear engagement signal.

20. The apparatus of claim 19 wherein, in the absence of said gear engagement signal, said processor means further restores said engine speed to said synchronous engine speed after increasing and decreasing engine speed.

21. The apparatus of claim 20 wherein said processor means performs error recovery if said gear engagement signal is not detected within a predetermined time period after restoring said engine speed to said synchronous engine speed.

22. The apparatus of claim 19 wherein the vehicle includes a rotatable tailshaft operably connected to the transmission, further including:

means for sensing tailshaft rotational speed and producing a tailshaft speed signal corresponding thereto; and means for sensing engine speed and producing an engine speed signal corresponding thereto;

wherein said processor means is responsive to said tailshaft speed signal to compute a target engine speed as an engine speed which is synchronized with said tailshaft speed signal, said processor means monitoring said engine speed signal and governing said engine speed to said synchronous engine speed defined as any engine speed within a first engine speed range of said target engine speed.

23. The apparatus of claim 22 wherein said processor means commands one of the automatically selectable gear ratios of the transmission by commanding an upshift corresponding to a numerically higher gear of the transmission;

and wherein said processor means is operable to increase said engine speed to said first speed level above said synchronous engine speed prior to decreasing said engine speed to said second speed level below said synchronous engine speed.

24. The apparatus of claim 22 wherein said processor means commands one of the automatically selectable gear ratios of the transmission by commanding a downshift corresponding to a numerically lower gear of the transmission;

and wherein said processor means is operable to decrease said engine speed to said second speed level below said synchronous engine speed prior to increasing said engine speed to said first speed level above said synchronous engine speed.

* * * * *